United States Patent

Romano, Jr. et al.

Patent Number: 6,053,438
Date of Patent: Apr. 25, 2000

[54] PROCESS FOR MAKING AN INK JET INK

[75] Inventors: Charles E. Romano, Jr.; Karen E. Maskasky, both of Rochester; Domenic Santilli, Webster, all of N.Y.

[73] Assignee: Eastman Kodak Company, Rochester, N.Y.

[21] Appl. No.: 09/170,660

[22] Filed: Oct. 13, 1998

[51] Int. Cl.$^7$ ........................................ B02C 19/12
[52] U.S. Cl. ............................................. 241/16; 241/21
[58] Field of Search ..................... 106/31.65, 31.75, 106/31.25; 347/100; 241/16, 21

[56] References Cited

U.S. PATENT DOCUMENTS 5,679,138  10/1997  Bishop et al. .

FOREIGN PATENT DOCUMENTS

WO 96/24642  8/1996  WIPO .

*Primary Examiner*—Mark Rosenbaum
*Attorney, Agent, or Firm*—Harold E. Cole

[57] ABSTRACT

A process for making an ink jet ink comprising:
 a) providing a dispersion containing a pigment, a hydrocarbon carrier, and a polyamine/fatty acid condensation polymer dispersant;
 b) mixing the pigment dispersion with rigid milling media less than 100 μm;
 c) introducing the mixture of step (b) into a mill;
 d) milling the mixture from step (c) until the pigment particle size is below about 100 nanometers (nm);
 e) adding to the mixture during or after step d) or f) (below) a stabilizer selected from the group consisting of a polyether polyol; a modified polyester resin; an acrylic polymer; an alkylol ammonium salt of a block copolymer having acidic groups; ethoxylated triethanolamine; a high molecular weight block copolymer having an amine functionality; sorbitan sesquioleate; polyhydroxy stearic acid; butylated polyvinyl pyrrolidone; poly(vinylpyrrolidone/1-hexadecene); and poly (p-tert-butylstyrene-co-styrene-co-2-sulfoethyl-lithium methacrylate);
 f) separating the milling media from the mixture milled in step (d); and
 g) diluting the mixture to obtain an ink jet ink having a pigment concentration suitable for ink jet printers.

18 Claims, No Drawings

PROCESS FOR MAKING AN INK JET INK

CROSS REFERENCE TO RELATED APPLICATION

Reference is made to commonly-assigned copending U.S. patent application Ser. No. 09/170,680, filed Oct. 13, 1998 (Docket 77574HEC) entitled Process for Making an Ink Jet Ink, by Santilli et al., the teachings of which are incorporated herein by reference.

FIELD OF THE INVENTION

This invention relates to a process for making an ink jet ink using a hydrocarbon carrier, a polyamine/fatty acid condensation polymer dispersant and a stabilizer to produce a dispersion characterized by nanometer-size pigment particles.

BACKGROUND OF THE INVENTION

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging. The inks used in ink jet printers are generally classified as either dye-based or pigment-based.

In pigment-based inks, the colorant exists as discrete particles. These pigment particles are usually treated with addenda known as dispersants or stabilizers which serve to keep the pigment particles from agglomerating and settling out of the carrier. Such a dispersant is necessary to produce a colloidally stable mixture and an ink that can be "jetted" reliably without clogging the print head nozzles.

Dispersing agents in an ink jet ink have the dual function of helping to break down pigments to sub-micron size during the milling process and of keeping the colloidal dispersion stable and free from flocculation for a long period of time. In general, dispersions suffer from poor colloidal stability due to particle agglomeration and/or sedimentation, thus limiting the usefulness of the dispersions in inks.

Although a wide variety of dispersing agents are known for pigmented ink jet inks, they are not without certain problems. For example, many dispersing agents are very selective as far as being able to disperse pigments to sub-micron size. In many instances, each class of pigments may require a specific dispersing agent. Another problem encountered with some polymeric dispersing agents is that they tend to impart an undesirably high viscosity to the resulting inks. Still another problem encountered with some dispersing agents is that their effectiveness is sometimes diminished over a period of time. Thus, there is a continuing need for improved dispersing agents for pigmented inks, especially for non-aqueous inks.

Dispersing agents for non-aqueous ink jet inks previously used include metal salts of styrene-acrylic copolymers, metal salts of sulfonated styrene-acrylic copolymers, phosphonium salts or quaternary ammonium salts of styrene-acrylic copolymers.

DESCRIPTION OF RELATED ART

U.S. Pat. No. 5,679,138 relates to a process for preparing an ink jet ink wherein the pigment particle size distribution obtained is quite small. There is a problem with this process, however, in that the carrier medium is limited to water. It would be desirable to provide ink jet inks which employ non-aqueous carriers in order to avoid paper deformation upon printing. However, dispersing agents commonly used for aqueous dispersions generally do not work in non-aqueous dispersions.

WO96/24642 and WO97/15633 disclose the use of a polyamine/fatty acid condensation polymer dispersant in a non-aqueous ink jet pigmented ink. However, there is a problem with inks prepared by the milling method disclosed in these references in that the particle size of the pigment particles is larger than one would like. A smaller particle size dispersion is desirable in order to provide a wider color gamut.

It is an object of this invention to provide a method for making a non-aqueous, pigment dispersion for an ink jet ink with a low particle size in order to obtain better covering power, and which would have less tendency to clog the ink jet nozzles. It is another object of this invention to provide a method for making a non-aqueous, pigment dispersion for an ink jet ink which employs a dispersant which enables the production of nanometer-size pigment particles. It is still another object of this invention to provide a method for making a non-aqueous, pigment dispersion for an ink jet ink having good stability.

SUMMARY OF THE INVENTION

These and other objects are achieved in accordance with this invention which relates to a process for making an ink jet ink comprising:

a) providing a dispersion containing a pigment, a hydrocarbon carrier, and a polyamine/fatty acid condensation polymer dispersant;

b) mixing the pigment dispersion with rigid milling media less than 100 µm;

c) introducing the mixture of step (b) into a mill;

d) milling the mixture from step (c) until the pigment particle size is below about 100 nanometers (nm);

e) adding to the mixture during or after step d) or f) (below) a stabilizer selected from the group consisting of a polyether polyol; a modified polyester resin; an acrylic polymer; an alkylol ammonium salt of a block copolymer having acidic groups; ethoxylated triethanolamine; a high molecular weight block copolymer having an amine functionality; sorbitan sesquioleate; polyhydroxy stearic acid; butylated polyvinyl pyrrolidone; poly(vinylpyrrolidone/1-hexadecene); and poly (p-tert-butylstyrene-co-styrene-co-2-sulfoethyl-lithium methacrylate);

f) separating the milling media from the mixture milled in step (d); and g) diluting the mixture to obtain an ink jet ink having a pigment concentration suitable for ink jet printers.

The dispersant used in the process of the invention is highly effective in reducing pigment particles to a size of less than about 100 nm when milled in the presence of very fine milling media. The resulting dispersion is characterized by nanometer-size pigment particles. The dispersing agents employed are useful with a wide variety of pigments. The stabilizing agent used in the process enables the dispersion to retain the small particle sizes for the pigments for extended periods of time.

DETAILED DESCRIPTION OF THE INVENTION

As noted above, the ink jet ink composition used in the process of the invention contains a polyamine/fatty acid condensation polymer dispersant. The dispersant is preferably used in a ratio of dispersant:pigment from about 0.1:1 to about 5:1. In a preferred embodiment, the ratio of dispersant:pigment is from about 0.5:1 to about 2:1.

In a preferred embodiment of the invention, the polyamine/fatty acid condensation polymer dispersant is poly(hydroxy stearate-co-ethyleneimine). These dispersants are available commercially as:

Solsperse® 13,940 dispersing agent, 40% solids in high boiling hydrocarbon from Zeneca Inc.; and Hypermer® LP-6 from ICI Surfactants.

Stabilizers useful in the invention are available commercially as follows:

Stabilizer 1: ethoxylated triethanolamine, available commercially as Ethoxy 3389 (Ethox Chemical Co.), used as a 20 wt. % solution in Isopar® G isoparaffin solvent Stabilizer 2: a polyether polyol, available commercially as PolyMax ED-P4 (Chemax Inc.), used as a 10 wt. % solution in Isopar® G isoparaffin solvent Stabilizer 3: a modified polyester resin available commercially as Nuosperse® 657 (Huls Co.), used neat (69% active)

Stabilizer 4: a modified polyester resin available commercially as Borchigen® BN911 (Bayer Co.), used neat (69% active)

Stabilizer 5: an acrylic polymer available commercially as Paraloid® B67 (Rohm and Haas Co.), used as a 20 wt. % solution in Isopar® G isoparaffin solvent Stabilizer 6: ethoxylated triethanolamine, available commercially as Synfac® TEA 97 (Milliken Chemical Co.), used neat (97% active)

Stabilizer 7: a high molecular weight block copolymer having an amine functionality, available commercially as Disperbyk® 182 (BYK Chemie.), used as a 40 wt. % solution in Dowanol® TPM solvent Stabilizer 8: sorbitan sesquioleate, available commercially as Arlacel® C (ICI Co.), used as a 60 wt. % solution in Isopar® G isoparaffin solvent Stabilizer 9: polyhydroxy stearic acid, available commercially as Arlacel® P-100 (ICI Co.), used as a 60 wt. % solution in Isopar® G isoparaffin solvent Stabilizer 10: butylated polyvinyl pyrrolidone, available commercially as Ganex® P-904 (ISP Technology), used as a 60 wt. % solution in Dowanol® TPM solvent Stabilizer 11: poly(vinylpyrrolidone/1-hexadecene), available commercially as Ganex® V-516 (ISP Technology), used as a 60 wt. % solution in Isopar® G isoparaffin solvent Stabilizer 12: poly(p-tert-butylstyrene-co-styrene-co-2-sulfoethyl-lithium methacrylate) (Eastman Kodak Co.), used as a 10 or 18 wt. % solution in Isopar® G isoparaffin solvent.

Stabilizer 13: an alkylol ammonium salt of a block copolymer having acidic groups, available commercially as Disperbyk® 180 (BYK Chemie.), used as a 40 wt. % solution in Dowanol® TPM solvent (Dow Chemical Co.)

In a preferred embodiment of the invention, the stabilizer is present in a ratio of pigment:stabilizer of from about 1:0.1 to about 1:1. In another preferred embodiment, the stabilizer is ethoxylated triethanolamine or poly(p-tert-butylstyrene-co-styrene-co-2-sulfoethyl-lithium methacrylate).

In the above process, before step f), there may be an additional milling step if desired in order to further reduce the particle size and/or distribution.

In the present invention, any of the known pigments can be used. Pigments can be selected from those disclosed, for example, in U.S. Pat. Nos. 5,026,427; 5,086,698; 5,141,556; 5,160,370; and 5,169,436, the disclosures of which are hereby incorporated by reference. The exact choice of pigments will depend upon the specific color reproduction and image stability requirements for the printer and application. The pigment must be totally insoluble in the carrier. For four-color printers, combination of cyan, magenta, yellow, and black (CMYK) pigments should be used. An exemplary four color set is bis(phthalocyanylalumino) tetraphenyl-disiloxane cyan, quinacridone magenta (p.r. 122), Hansa® Brilliant Yellow 5GX-02 (p.y. 74), and carbon black (p.b. 7).

As noted above, the pigment particle size obtained using this process is below about 100 nm. This figure is understood to mean the $50^{th}$ percentile value (half of the particles have a particle size below that value and half are above). Particle size distributions can be measured on diluted millgrind samples (about 50:1) using a Leeds & Northrop Ultrafine Particle Analyzer (UPA).

The process of preparing inks from pigments commonly involves two steps: (a) a dispersing or milling step to break up the pigment to the primary particle, and (b) a dilution step in which the dispersed pigment concentrate is diluted with a carrier and other addenda to a working strength ink. In the milling step, the pigment is usually suspended in a carrier along with rigid, inert milling media less than about 100 $\mu$m. The dispersing agent is added at this stage. Mechanical energy is supplied to this pigment dispersion, and the collisions between the milling media and the pigment cause the pigment to deaggregate into its primary particles.

There are many different types of materials which may be used as milling media, such as glasses, ceramics, metals, and plastics. In a preferred embodiment, the grinding media can comprise particles, preferably substantially spherical in shape, i.e., beads consisting essentially of a polymeric resin.

In general, polymeric resins suitable for use as milling media are chemically and physically inert, substantially free of metals, solvent and monomers and of sufficient hardness and resilience to enable them to avoid being chipped or crushed during milling. Suitable polymeric resins include crosslinked polystyrenes, such as polystyrene crosslinked with divinylbenzene, styrene copolymers, polyacrylates such as poly(methylmethacrylate), polycarbonates, polyacetals such as Derlin®, vinyl chloride polymers and copolymers, polyurethanes, polyamides, poly (tetrafluoroethylenes), e.g. Teflon®, and other fluoropolymers, high density polyethylenes, polypropylenes, cellulose ethers and esters such as cellulose acetate, poly(hydroxyethylmethacrylate), poly (hydroxyethyl acrylate), silicone containing polymers such a polysiloxanes and the like. The polymer can be biodegradable. Exemplary biodegradable polymers include poly (lactides), poly(glycolids) copolymers of lactides and glycolide, polyanhydrides, poly(imino carbonates), poly(N-acylhydroxyproline)esters, poly(palmitoyl hydroxyproline) esters, ethylenevinylacetate copolymers, poly(orthoesters), poly(caprolactones), and poly(phosphazines). The polymeric resin can have a density from 0.9 to 3.0 g/cm$^3$. Higher density resins are preferred inasmuch as it is believed that these provide more efficient particle size reduction. Most preferred are crosslinked or uncrosslinked polymeric media based on styrene.

Milling can take place in any suitable grinding mill. Suitable mills include an airjet mill, a roller mill, a ball mill, an attritor mill and a bead mill. A high speed mill is preferred, such as those manufactured by Morehouse-Cowles, Hockmeyer, or Premier Mills.

By high speed mill is meant a milling device capable of accelerating milling media to velocities greater about 5 meters per second. The mill can contain a rotating shaft with one or more impellers. In such a mill the velocity imparted to the media is approximately equal to the peripheral velocity of the impeller, which is the product of the impeller rev/min and the impeller diameter. Sufficient milling media velocity is achieved, for example, in Cowles-type saw tooth impeller having a diameter of 40 mm when operated at 9,000 rev/min. The preferred proportions of the milling media, the pigment, the carrier and dispersing agent can vary within wide limits and depend, for example, upon the particular material selected and the size and density of the milling media, etc.

Batch Milling

A slurry of <100 $\mu$m milling media, carrier, pigment, and dispersing agent(s) is prepared using simple mixing. This slurry may be milled in conventional high energy batch milling processes such as high speed attritor mills, vibratory mills, ball mills, etc. This slurry is milled for a predetermined length of time to allow comminution of the active material to a minimum particle size. After milling is complete, the dispersion of active material is separated from the grinding media by a simple sieving or filtration.

The milling time can vary widely and depends upon the pigment, mechanical means and residence conditions selected, the initial and desired final particle size, etc.

The carrier can be any of the high boiling hydrocarbons such as isoparaffinic hydrocarbon solvents, e.g., Isopar-G® (Exxon Chemical Co.) or Exxsol® D130 from Exxon Chem. Co. Selection of a suitable solvent depends on the requirements of the specific application, such as viscosity, surface tension, drying time of the pigmented ink jet ink, and the type of receiver on which the ink will be printed. The amount of the carrier employed is in the range of about 20 to 40 weight %, preferably about 25 to about 35 weight %, based on the total weight of the slurry.

Ink Preparation

In general, it is desirable to make the pigmented ink jet ink in the form of a concentrated millgrind, which is subsequently diluted to the appropriate concentration for use in the ink jet printing system. This technique permits preparation of a greater quantity of pigmented ink from the equipment. The millgrind is diluted with appropriate solvent to a concentration best for viscosity, color, hue, saturation density, and print area coverage for the particular application.

In the case of organic pigments, the ink may contain up to about 20% pigment by weight, but will generally be in the range of about 0.1 to 10%, preferably about 0.25 to about 5%, by weight of the total ink composition for most of the ink jet printing applications.

Acceptable viscosities, as determined using Brookfield apparatus and related methods are generally not greater than 20 centipoise, and are preferably in the range of about 1 to 15 centipoise.

The ink has physical properties compatible with a wide range of ejecting conditions, i.e., driving voltages and pulse widths for thermal ink jet printing devices, driving frequencies of the piezo element for either a drop-on-demand device or a continuous device, and the shape and size of the nozzle.

Ingredients, other than pigment(s), carrier, dispersing agent and stabilizer may be added to the ink such as milling aids, dewetting agents, charge agents, thickeners, conductive enhancing agents, drying agents, etc.

The ink jet inks provided by this invention are employed in ink jet printing wherein liquid ink drops are applied in a controlled fashion to an ink receptive substrate, by ejecting ink droplets from plurality of nozzles, or orifices, in a print head of ink jet printers.

Commercially available ink jet printers use several different schemes to control the deposition of the ink droplets. Such schemes are generally of two types: continuous stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance digital data signals. An ink droplet is not generated and ejected through the orifices of the print head unless it is needed. Ink jet printing methods, and related printers, are commercially available and need not be described in detail.

The ink jet inks provided by this invention are employed in ink jet printing wherein liquid ink drops are applied in a controlled fashion to an ink receptive layer substrate, by ejecting ink droplets from the plurality of nozzles, or orifices, in a print head of ink jet printers Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference.

The following examples illustrate the utility of the present invention.

EXAMPLES

Example 1

A cyan dispersion was prepared by mixing the following ingredients:

18.0 g bis(phthalocyanylalumino)tetraphenyl-disiloxane (Eastman Kodak Co.)

45.0 g Hypermer®LP-6 dispersant (40% solution in high boiling hydrocarbon) (ICI Surfactants)

50 g Isopar-G® hydrocarbon solvent (Exxon Chemical Co.)

175 g 50 $\mu$m polymeric milling media (crosslinked polystyrene beads)

The above components were mixed and then milled in a BYK-Gardner 1-liter water-jacketed vessel using a high energy laboratory dispersator manufactured by Premier Mill Corp. and a 40 mm Cowles-type milling blade rotating at 7,000 rev/min. The mill was run for approximately 5 hours at room temperature. The milling speed was then increased to 8600 rev/min and continued until 8.5 hr. Also, 8.8 g of Hypermer®LP-6 dispersant was added to the mill grind. The ink concentrate was diluted with 150 g Isopar-G® solvent and mixed for a few minutes before being separated from the milling media. The dispersion was separated from the milling media by filtering the millgrind through a 10–20 $\mu$m KIMAX® Buchner Funnel obtained from VWR Scientific Products.

This dispersion was then split (5 g aliquots) into vials each containing one of the stabilizers described above, or a control stabilizer as described below, such that the active component was 20 wt. % of the pigment. The test samples were mixed well and stored for particle size evaluation as a function of time. Particle size distributions were obtained on diluted millgrind samples (about 50:1) using a Leeds & Northrop Ultrafine Particle Analyzer (UPA). The results obtained are a 50% median value. Particle size, as measured by UPA, are listed in Table 1 below.

Control Stabilizers

Control Stabilizer 1: cocoyl hydroxyethyl imidazoline, Mackazoline® C (McIntyre Group Ltd.);

Control Stabilizer 2: polyoxyalkylene amine, XTJ-509 (Huntsman Petrochemical Corp.)

Control Stabilizer 3: long chain fatty ester, Sotex® N (Morton International Inc.)

TABLE 1

| Dispersion | Stabilizer | UPA @ 3 days (μm) | UPA @ 24 days (μm) |
|---|---|---|---|
| 1 | None (Control) | 0.025 | 0.129 |
| 2 | 2 | 0.019 | 0.024 |
| 3 | 3 | 0.020 | 0.021 |
| 4 | 4 | 0.021 | 0.022 |
| 5 | 5 | 0.020 | 0.023 |
| 6 | 6 | 0.021 | 0.021 |
| 7 | 7 | 0.020 | 0.021 |
| 8 | 8 | 0.020 | 0.024 |
| 9 | 9 | 0.020 | 0.018 |
| 10 | 10 | 0.019 | 0.023 |
| 11 | 11 | 0.022 | 0.020 |
| 12 | 12* | 0.033 | 0.021 |
| 13 | 12** | 0.020 | 0.020 |
| 14 | 12*** | 0.025 | 0.021 |
| 15 | Control Stabilizer 1 | 0.184 | — |
| 16 | Control Stabilizer 2 | 0.200 | — |
| 17 | Control Stabilizer 3 | 0.210 | — |

*poly(p-tert-butylstyrene-co-styrene-co-2-sulfoethyl-lithium methacrylate) (72:24:4)
**poly(p-tert-butylstyrene-co-styrene-co-2-sulfoethyl-lithium methacrylate) (48:48:4)
***poly(p-tert-butylstyrene-co-styrene-co-2-sulfoethyl-lithium methacrylate) (24:72:4)

The above results show that use of the stabilizers of the invention provided dispersions which were stable (very little change in particle size) at room temperature for up to 24 days, in comparison to the control element without any stabilizer and various control stabilizers.

Example 2

A yellow dispersion was prepared similar to Example 1 by mixing the following ingredients:
18.0 g Hansa Brilliant Yellow 5GX-02 (p.y. 74) (Hoechst Chemical Co.)
45.0 g Solsperse® 13,940 dispersant (40% solution in high boiling hydrocarbon) (Zeneca Inc.)
50 g Isopar-G® hydrocarbon solvent
175 g 50 μm polymeric milling media (crosslinked polystyrene beads)

The dispersion was milled and treated as in Example 1 except that the slurry was milled at 8600 rev/min for 3.5 hours. This dispersion was then split (7.5 g aliquots) into vials and evaluated as in Example 1 using one of the stabilizers described above and the control stabilizers listed below, using the time periods listed in Table 2, with the following results:
Control Stabilizers
Control Stabilizer 4: polyurethane oligomer, Borchigen® SN88 (Bayer Co.)
Control Stabilizer 5: POE (15) cocoamine, Chemeen® C-15 (Chemax Inc.)
Control Stabilizer 6: polyoxyethylene 30 tallow diamine, Chemax® DT-30 (Chemax Inc.)
Control Stabilizer 7: saturated polyester with acidic groups, Disperbyk-110® (BYK Chemie, USA)
Control Stabilizer 8: potassium salt of a phosphated alkoxylated aryl phenol, SynFac® 8337 (Milliken Chemicals Co.)
Control Stabilizer 9: modified fatty acid diethanol amide, Witflow® 934 (Witco Co.)
Control Stabilizer 10: telomer B monoether with polyethylene glycol, Zonyl® FSO 100 (DuPont Corp.)
Control Stabilizer 11: ethoxylated (15) n-tallowalkyl trimethylene diamines, Ethoduomeen® T/25 (Akzo Nobel Chemicals Inc.)
Control Stabilizer 12: dipropylene glycol dibenzoate, Finsolv® PG-22 (Finetex Co.)
Control Stabilizer 13: p-phenyl phenal propylene oxide/ethylene oxide, Antarox® WA-1 (Rhone Poulenc Co.)
Control Stabilizer 14: tristyryl phenol ethoxylates, Soprophor® BSV (Rhone Poulenc Co.)

TABLE 2

| Dispersion | Stabilizer | UPA @ 1 day (μm) | UPA @ 12 weeks (μm) |
|---|---|---|---|
| 18 | None (Control) | 0.24 | — |
| 19 | 13 | 0.019 | 0.020 |
| 20 | 1 | 0.020 | 0.023 |
| 21 | Control Stabilizer 4 | * | * |
| 22 | Control Stabilizer 5 | * | * |
| 23 | Control Stabilizer 6 | * | * |
| 24 | Control Stabilizer 7 | * | * |
| 25 | Control Stabilizer 8 | * | * |
| 26 | Control Stabilizer 9 | * | * |
| 27 | Control Stabilizer 10 | * | * |
| 28 | Control Stabilizer 11 | * | * |
| 29 | Control Stabilizer 12 | * | * |
| 30 | Control Stabilizer 13 | * | * |
| 31 | Control Stabilizer 14 | * | * |

*Dispersion thickened to a non-fluid gel and particle sizes were not measured since the dispersion was no longer useful as an ink The above results show that use of the stabilizers of the invention provided dispersions which were stable (very little change in particle size) at room temperature for up to 12 weeks, in comparison to the control element without any stabilizer and various control stabilizers.

The invention has been described in detail with particular reference to certain preferred embodiments thereof, but it will be understood that variations and modifications can be effected within the spirit and scope of the invention.

What is claimed is:

1. A process for making a non-aqueous, pigment dispesion for an ink jet ink comprising:
   a) providing a dispersion containing a pigment, a hydrocarbon carrier, and a polyamine/fatty acid condensation polymer dispersant;
   b) mixing the pigment dispersion with rigid milling media less than 100 μm;
   c) introducing the mixture of step (b) into a mill;
   d) milling the mixture from step (c) until the pigment particle size is below about 100 nanometers (nm);
   e) adding to the mixture during or after step d) a stabilizer selected from the group consisting of a polyether polyol; a modified polyester resin; an acrylic polymer; an alkylol ammonium salt of a block copolymer having acidic groups; ethoxylated triethanolamine; a high molecular weight block copolymer having an amine functionality; sorbitan sesquioleate; polyhydroxy stearic acid; butylated polyvinyl pyrrolidone; poly (vinylpyrrolidone/1-hexadecene); and poly(p-tert-butylstyrene-co-styrene-co-2-sulfoethyl-lithium methacrylate);
   f) separating the milling media from the mixture milled in step (d); and
   g) diluting the mixture to obtain an ink jet ink having a pigment concentration suitable for ink jet printers.

2. The process of claim 1 wherein said dispersant is present in a ratio of dispersant:pigment of from about 0.1:1 to about 5:1.

3. The process of claim 1 wherein said dispersant is present in a ratio of dispersant:pigment of from about 0.5:1 to about 2:1.

4. The process of claim 1 wherein said dispersion contains from about 0.1 to 10% by weight of said pigment.

5. The process of claim 1 wherein said polyamine/fatty acid condensation polymer is poly(hydroxy stearate-co-ethyleneimine).

6. The process of claim 1 wherein said hydrocarbon carrier is an isoparaffin.

7. The process of claim 1 wherein said stabilizer is present in a ratio of pigment:stabilizer of from about 1:0.1 to about 1:1.

8. The process of claim 1 wherein said stabilizer is ethoxylated triethanolamine.

9. The process of claim 1 wherein said stabilizer is poly(p-tert-butylstyrene-co-styrene-co-2-sulfoethyl-lithium methacrylate).

10. A process for making a non-aqueous, pigmented dispersion for an ink jet ink comprising:
   a) providing a dispersion containing a pigment, a hydrocarbon carrier, and a polyamine/fatty acid condensation polymer dispersant;
   b) mixing the pigment dispersion with rigid milling media less than 100 μm;
   c) introducing the mixture of step (b) into a mill;
   d) milling the mixture from step (c) until the pigment particle size is below about 100 nanometers (nm);
   e) separating the milling media from the mixture milled in step (d);
   f) adding to the mixture a stabilizer selected from the group consisting of a polyether polyol; a modified polyester resin; an acrylic polymer; an alkylol ammonium salt of a block copolymer having acidic groups; ethoxylated triethanolamine; a high molecular weight block copolymer having an amine functionality; sorbitan sesquioleate; polyhydroxy stearic acid; butylated polyvinyl pyrrolidone; poly(vinylpyrrolidone/1-hexadecene); and poly(p-tert-butylstyrene-co-styrene-co-2-sulfoethyl-lithium methacrylate); and
   g) diluting the mixture to obtain an ink jet ink having a pigment concentration suitable for ink jet printers.

11. The process of claim 10 wherein said dispersant is present in a ratio of dispersant:pigment of from about 0.1:1 to about 5:1.

12. The process of claim 10 wherein said dispersant is present in a ratio of dispersant:pigment of from about 0.5:1 to about 2:1.

13. The process of claim 10 wherein said dispersion contains from about 0.1 to 10% by weight of said pigment.

14. The process of claim 10 wherein said polyamine/fatty acid condensation polymer is poly(hydroxy stearate-co-ethyleneimine).

15. The process of claim 10 wherein said hydrocarbon carrier is an isoparaffin.

16. The process of claim 10 wherein said stabilizer is present in a ratio of pigment:stabilizer of from about 1:0.1 to about 1:1.

17. The process of claim 10 wherein said stabilizer is ethoxylated triethanolamine.

18. The process of claim 10 wherein said stabilizer is poly(p-tert-butylstyrene-co-styrene-co-2-sulfoethyl-lithium methacrylate).

* * * * *